United States Patent
Leviness et al.

[11] Patent Number: 5,811,363
[45] Date of Patent: Sep. 22, 1998

[54] CATALYST REJUVENATION IN HYDROCARBON SYNTHESIS SLURRY WITH REDUCED SLURRY RECONTAMINATION

[75] Inventors: Stephen C. Leviness, Baton Rouge, La.; Willard N. Mitchell, Ridgeland, Miss.

[73] Assignee: Exxon Research and Engineering Company, Florham Park, N.J.

[21] Appl. No.: 850,563

[22] Filed: May 2, 1997

[51] Int. Cl.[6] ..................................................... B01J 20/34
[52] U.S. Cl. ................................. 502/21; 502/22; 502/53; 518/700
[58] Field of Search .................... 502/21, 22, 53; 518/700

[56] References Cited

U.S. PATENT DOCUMENTS

| | | | |
|---|---|---|---|
| 5,260,239 | 11/1993 | Hsia | 502/30 |
| 5,268,344 | 12/1993 | Pedrick et al. | 502/30 |
| 5,283,216 | 2/1994 | Mitchell | 502/30 |
| 5,288,673 | 2/1994 | Behrmann et al. | 502/30 |
| 5,382,748 | 1/1995 | Behrmann et al. | 585/899 |

*Primary Examiner*—Gary Geist
*Assistant Examiner*—Jafar Parsa
*Attorney, Agent, or Firm*—Jay Simon

[57] ABSTRACT

A reversibly deactivated, particulate catalyst in a hydrocarbon synthesis slurry is rejuvenated by circulating the slurry from a slurry body through a rejuvenation zone in which hydrogen contacts the slurry and rejuvenates the catalyst to form a rejuvenated catalyst slurry and an offgas which contains catalyst deactivating species. The offgas is separated and removed from the rejuvenated slurry before it is passed back into the slurry body. This avoids or minimizes contamination and recontamination of the slurry body with the deactivating species produced by the rejuvenation process.

14 Claims, 4 Drawing Sheets

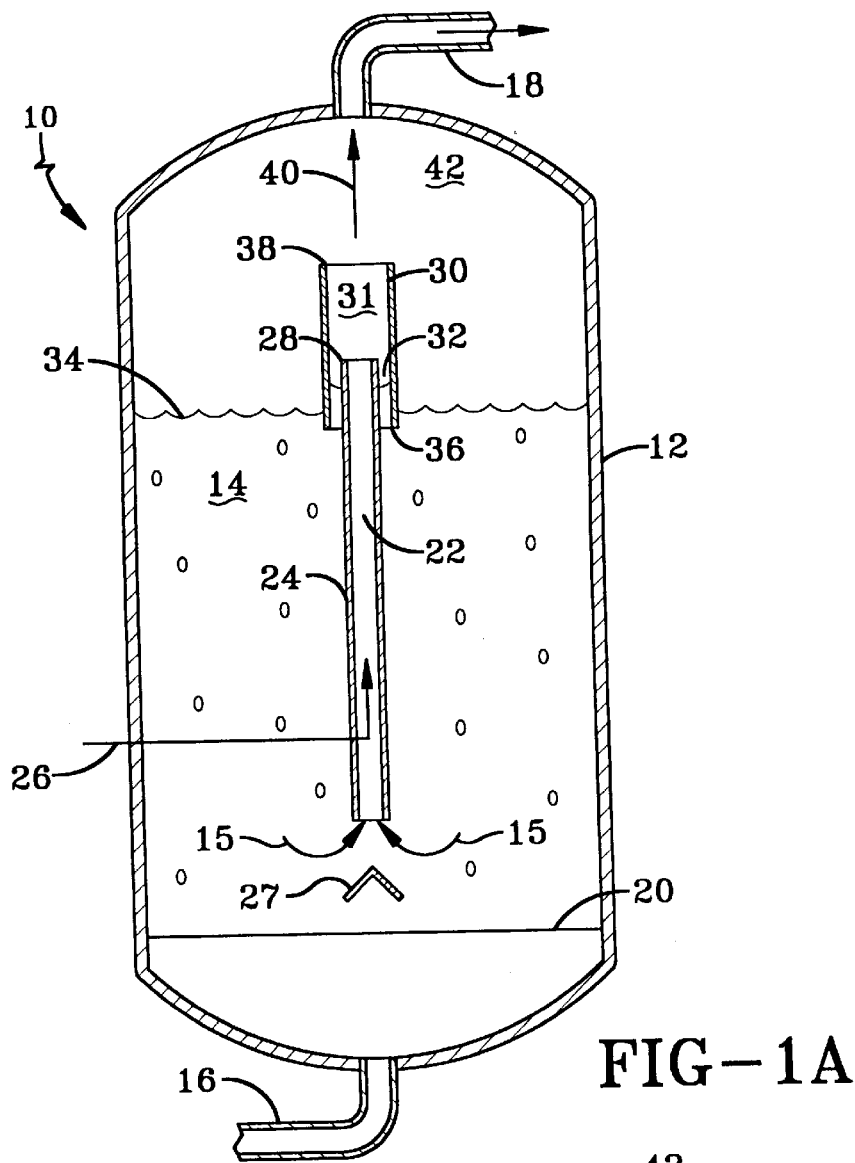
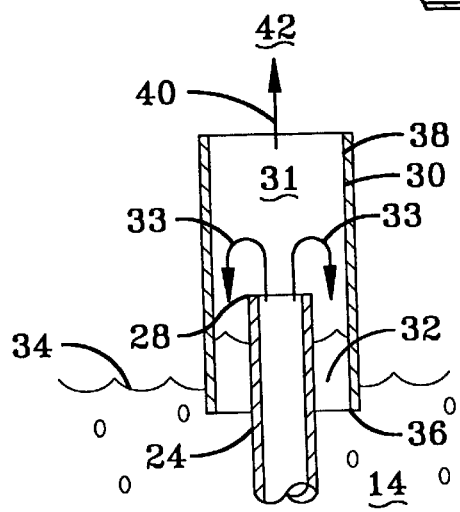
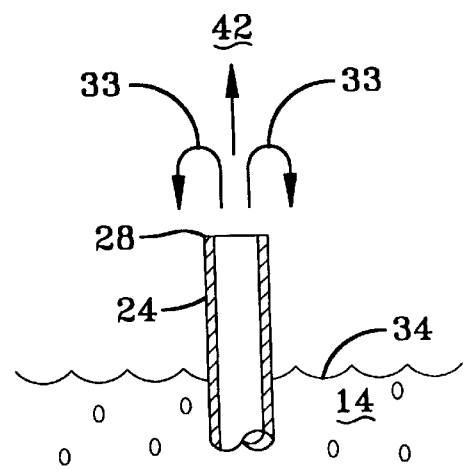
FIG-1A
FIG-1B
FIG-1C

CATALYST REJUVENATION IN HYDROCARBON SYNTHESIS SLURRY WITH REDUCED SLURRY RECONTAMINATION

BACKGROUND OF THE DISCLOSURE

1. Field of the Invention

The invention relates to a process for rejuvenating solid catalyst particles in a slurry with reduced slurry contamination. More particularly, the invention relates to a process and means for rejuvenating solid catalyst particles dispersed in a three phase, Fischer-Tropsch type hydrocarbon slurry comprising said particles, a hydrocarbon liquid and gas bubbles, in-situ in the slurry, with reduced recontamination of the slurry body by catalyst deactivating species.

2. Background of the Invention

Slurry hydrocarbon synthesis (HCS) processes are known. In a slurry HCS process a synthesis gas (syngas) comprising a mixture of $H_2$ and CO is bubbled up as a third phase through a slurry in a reactor in which the slurry liquid comprises hydrocarbon products of the synthesis reaction and the dispersed, suspended solids comprise a suitable Fischer-Tropsch type hydrocarbon synthesis catalyst. Reactors which contain such a three phase slurry are sometimes referred to as "bubble columns", as is disclosed in U.S. Pat. No. 5,348,982. Irrespective of whether the slurry reactor is operated as a dispersed or slumped bed, the mixing conditions in the slurry will typically be somewhere between the two theoretical conditions of plug flow and back mixed. Syngas made from hydrocarbon feedstocks which contain nitrogen (i.e., natural gas) or nitrogen containing compounds (i.e., resids, coal, shale, coke, tar sands, etc.) invariably contains HCN, $NH_3$ which contaminate the reactive slurry and rapidly, but reversibly, deactivate the catalyst. Certain oxygenates and carbonaceous compounds which are formed in the slurry as by-products of the HCS reaction are also believed to cause rapid deactivation. Deactivation of such catalysts by these species is reversible and catalytic activity is restored (the catalyst rejuvenated) by contacting the deactivated catalyst with hydrogen. The activity of the HCS catalyst in the reactive slurry may be intermittently or continuously rejuvenated by contacting the slurry with hydrogen or a hydrogen containing gas to form a rejuvenated catalyst slurry as is disclosed, for example, in U.S. Pat. Nos. 5,260,239 and 5,268,344.

It has now been found that the catalyst rejuvenation process produces a rejuvenation offgas as a by-product, which contains species that are catalyst deactivating. In the prior art processes, the rejuvenated slurry containing the offgas is returned to the reactive slurry. Permitting the offgas to contact and mix with the slurry body recontaminates it with catalyst deactivating species, thereby limiting the overall efficiency of the catalyst rejuvenation process. Therefore, it would be an improvement in the art if the catalyst could be rejuvenated in the slurry without recontaminating it with catalyst deactivating species present in the rejuvenation offgas.

SUMMARY OF THE INVENTION

The invention relates to a process and a means for rejuvenating solid catalyst particles in-situ in a three phase hydrocarbon synthesis (HCS) slurry with reduced recontamination of the slurry with catalyst deactivating species in the offgas produced by the rejuvenation process. Briefly, the process of the invention comprises passing the rejuvenated catalyst slurry from the rejuvenating zone into a gas separating zone in which the offgas is separated from the rejuvenated slurry, with the gas reduced slurry then returned to the slurry body. The slurry comprises gas bubbles and catalyst particles dispersed in a slurry liquid. The gas bubbles comprise unreacted synthesis gas (syngas) and gas products of the HCS reaction. The slurry liquid comprises hydrocarbon products of the HCS reaction which are liquid at the reaction conditions. Contacting the slurry body in an HCS reactor or in a separate HCS slurry catalyst rejuvenation vessel, with a rejuvenation offgas which contains catalyst deactivating species, limits the overall efficiency of the catalyst rejuvenation process by requiring the use of more hydrogen for rejuvenation or the reactor has to be run hotter to offset the reduced activity and maintain productivity. Hydrogen is costly and higher reactor temperatures increase gas make, with less selectivity towards liquid products. One example of a suitable means useful in the process of the invention comprises a simple, vertical rejuvenation tube or zone of the type disclosed in the prior art, but wherein the slurry exit is in fluid communication with a gas separating means, such as a shroud surrounding the exit, for separating the offgas from the catalyst rejuvenated slurry exiting the rejuvenation zone and passing the offgas reduced slurry back into the slurry body. Thus, in one embodiment the invention relates to a process for rejuvenating a particulate HCS catalyst suspended in an HCS hydrocarbon slurry liquid in which at least a portion of the catalyst is reversibly deactivated, the process comprising circulating a portion of the slurry from a slurry body through a catalyst rejuvenating zone in which a catalyst rejuvenating gas contacts the catalyst in the liquid to rejuvenate at least a portion of the catalyst and form a rejuvenated catalyst slurry, and a rejuvenating offgas which contains catalyst deactivating species, and separating the offgas from the rejuvenated slurry to form an offgas lean rejuvenated slurry. The offgas is separated from the slurry in a gas separating zone, which may also be referred to as a gas disengaging zone. In a further embodiment, the offgas lean rejuvenated slurry is then returned to the slurry body. The process of the invention results in increased production and greater selectivity to liquid products, with less catalyst inventory and rejuvenation required during the process. However, while the practice of the invention finds particular use with rejuvenating an HCS catalyst in-situ in a hydrocarbon slurry liquid, it is not intended to be limited to this particular embodiment.

The slurry body may be a reactive slurry in a slurry reaction zone, such as a three phase slurry comprising a hydrocarbon liquid in which is dispersed catalyst particles and reactive gas bubbles, as in a slurry type HCS reaction zone disclosed in the prior art, or it may be separate from a reaction zone as disclosed in the '239 patent referred to above. The term "slurry body" is used herein to refer to the slurry body from which a portion is withdrawn and passed into the rejuvenation zone or the slurry body into which the rejuvenated slurry is passed into (they may both be the same body), to distinguish it from the slurry in the rejuvenation zone and the rejuvenated slurry exiting the rejuvenation zone. While the catalyst rejuvenation zone is separate from the slurry body, in some embodiments all or at least a portion of it may be located within the slurry body. In the context of the invention, the term "catalyst deactivating species" is meant to include species which reversibly deactivate the catalyst and wherein the catalyst activity is restored (the catalyst rejuvenated) by contact with a rejuvenating gas in-situ in the slurry liquid. Hydrogen or a hydrogen containing gas is useful for such rejuvenation, as has been demonstrated in the prior art. Finally, while HCN, $NH_3$ and certain types of oxygenates and carbonaceous materials will deactivate the catalyst, the invention is not intended to be limited to use only with these species, but is useful with any deactivating species.

The gas separating zone for separating the catalyst rejuvenated slurry from the rejuvenation product offgas is in fluid communication with the rejuvenating zone, but not necessarily with the slurry body, and may be simply an extension of the exit of the rejuvenation zone out of the slurry body. In another embodiment it may comprise simple conduit means, such as a pipe open at both ends, the bottom of which is immersed in the slurry and the top located near the reactor gas outlet proximate to the top of the reactor. In yet another embodiment the offgas may be passed from the rejuvenating zone directly out of the reactor in an offgas conduit, as is explained in detail below. In another embodiment the offgas from one or more rejuvenation zones is passed from the rejuvenation zones directly into a manifold and out of the reactor. In an embodiment with specific regard to a slurry HCS process, the process of the invention comprises the steps of:

(a) contacting a syngas comprising a mixture of $H_2$ and CO in the presence of catalyst deactivating species, with a solid particulate hydrocarbon synthesis catalyst dispersed in a slurry body comprising said catalyst, hydrocarbon slurry liquid and gas bubbles, under reaction conditions effective to form hydrocarbons from said syngas, wherein said species at least partially reversibly deactivate said catalyst in said slurry and wherein said hydrocarbon liquid comprises HCS reaction products which are liquid at said reaction conditions;

(b) passing a portion of said slurry from said slurry body into a catalyst rejuvenation zone;

(c) contacting said slurry in said rejuvenation zone with a gas which at least partially rejuvenates said catalyst therein to form (i) a rejuvenated catalyst slurry and (ii) a rejuvenating offgas which contains species which will deactivate said catalyst, and (d) passing said rejuvenated catalyst slurry and offgas into a gas separating zone and separating said offgas from said rejuvenated catalyst slurry to form an offgas lean rejuvenated catalyst slurry.

In a further embodiment, the gas lean rejuvenated slurry is passed into the slurry body or into a body comprising the rejuvenated slurry, at least a portion of which is returned to the slurry body. The separated offgas is sent to further processing or consumed as fuel. In a still further embodiment in which the slurry body from which the slurry containing the deactivated catalyst is withdrawn also contains gas bubbles which would interfere with the catalyst rejuvenation, the gas bubbles are first separated from the slurry prior to passing it into the rejuvenation zone. This may be accomplished by any suitable means, including a gas disengaging means or cup immersed in the slurry, as will be described in detail below. Still further, the deactivated catalyst present in the slurry may be concentrated in the slurry liquid before being passed into the rejuvenating zone, by means which can include gas disengagement and which will be described in detail below. The slurry reactor may be operating during rejuvenation or it may be taken off-line and batch rejuvenated. When rejuvenation occurs while the HCS reactor is on-line and producing hydrocarbon liquids, a portion of the liquids are continuously withdrawn from the reactor. These liquids are further processed into useful products. In a still further embodiment the invention includes generating the syngas by partially combusting a suitable hydrocarbon which contains nitrogen or nitrogen containing compounds to form a syngas comprising a mixture of $H_2$ and CO and which also contains nitrogen species (e.g., HCN and $NH_3$) and/or other species which reversibly deactivate a Fischer-Tropsch type of hydrocarbon synthesis catalyst. By reversibly deactivate in the sense of a Fischer-Tropsch type of hydrocarbon synthesis catalyst is meant that the catalyst activity is restored by contacting the catalyst, in the slurry liquid, with hydrogen or a hydrogen containing gas.

BRIEF DESCRIPTION OF THE DRAWINGS

FIGS. 1 (a), 1 (b) and 1 (c) respectively schematically illustrate an HCS slurry reactor containing means for separating offgas from rejuvenated slurry according to the invention, and a detail of two such means.

DETAILED DESCRIPTION

Figure 2:
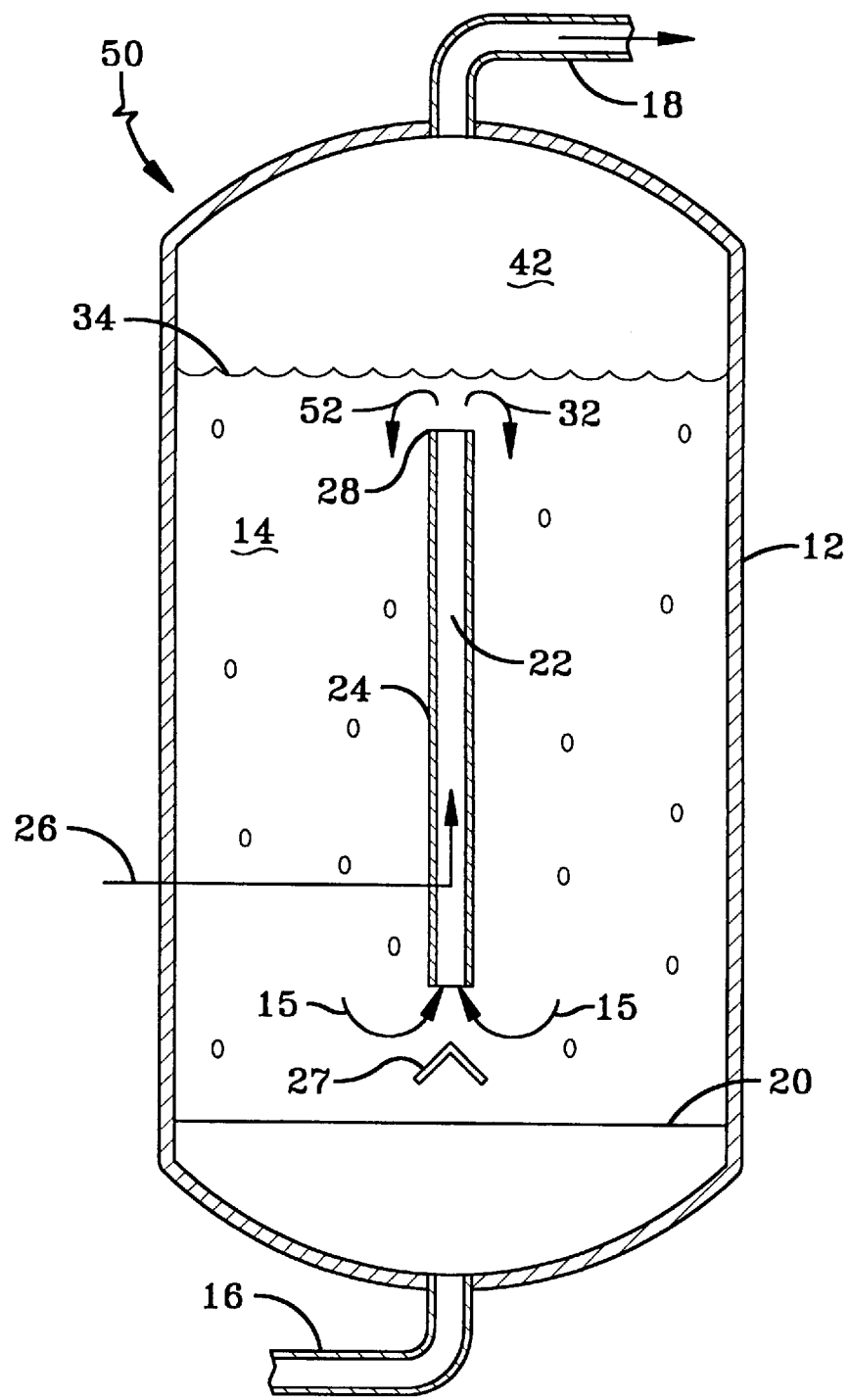
FIG. 2 is a schematic illustrating an HCS reactor containing a rejuvenation tube fully immersed in the slurry according to the prior art.

In a Fischer-Tropsch slurry HCS process, a syngas comprising a mixture of $H_2$ and CO is bubbled up into a reactive slurry in which it is catalytically converted into hydrocarbons and preferably liquid hydrocarbons. The mole ratio of the hydrogen to the carbon monoxide may broadly range from about 0.5 to 4, but which is more typically within the range of from about 0.7 to 2.75 and preferably from about 0.7 to 2.5. The stoichiometric mole ratio for a Fischer-Tropsch HCS reaction is 2.0, but there are many reasons for using other than a stoichiometric ratio as those skilled in the art know and a discussion of which is beyond the scope of the present invention. In a slurry HCS process the mole ratio of the $H_2$ to CO is typically about 2.1/1. The syngas may be formed by various means, including contacting a hot carbonaceous material such as coke or coal, with steam, or from a feed comprising methane. A feed comprising methane is preferred for convenience, cleanliness and because it doesn't leave large quantities of ash to be handled and disposed of The methane containing gas feed is obtained from natural gas or by burning coal, tar, liquid hydrocarbons and the like and is fed into a syngas generator. The production of syngas from methane by either partial oxidation, steam reforming or a combination thereof is well known as is disclosed, for example, in U.S. Pat. No. 4,888,131. In many cases it is preferred to catalytically partially oxidize and steam reform the methane in a fluid bed syngas generating unit (FBSG) as is disclosed, for example, in U.S. Pat. Nos. 4,888,131 and 5,160,456. Irrespective of the source of the methane, nitrogen or nitrogen containing compounds are present in the methane containing gas fed into the syngas generator, some of which are converted into $NH_3$ and HCN during the syngas formation. These will deactivate a Fischer-Tropsch HCS catalyst, particularly those comprising Co as the catalytic metal. As the prior art teaches, deactivation by these species is reversible and the catalyst can be rejuvenated by contacting it with hydrogen. This restoration of the catalytic activity of a reversibly deactivated catalyst is referred to as catalyst rejuvenation. The prior art rejuvenation processes disclosed, for example, in the U.S. Pat. Nos. 5,260,239 and 5,268,344 patents referred to above, are suitable when the concentration of nitrogen species in the syngas is low and when the offgas contains primarily $CH_4$, $H_2O$ and the like, produced from the HCS process and rejuvenation due to deactivation primarily by oxygenates and carbonaceous compounds. However, it has now been found that when the syngas contains appreciable amounts (e.g., $\geq 50$ vppb and even $\geq 20$ vppb) of a combined total of deactivating species such as HCN and $NH_3$, the rejuvenation offgas contains some of the same catalyst deactivating species present in the syngas which resulted in the catalyst deactivation in the first place (e.g., $NH_3$ and HCN) and the prior art rejuvenation processes in which the offgas is passed back into the reactive slurry are not adequate enough to maintain viable levels of catalyst activity. The net effect is a diminution in the benefit gained by the rejuvenation process and, consequently, a way had to be found to remove the offgas from the rejuvenated slurry in a manner which did not result in contamination or recontamination of the slurry body with the catalyst deactivating species. The present invention is a solution to this problem.

Referring now to FIGS. 1 (*a*) and 1 (*b*), there is schematically shown a slurry type HCS reactor 10 comprising a cylindrical steel vessel 12, a gas line 16 for feeding the syngas into the bottom of the reactor, a gas product line 18 at the top for removing gas products of the Fischer-Tropsch type HCS reaction, unreacted syngas and the catalyst rejuvenating offgas, and which contains a three phase slurry 14 within. The slurry comprises hydrocarbon liquid in which is dispersed and suspended a particulate HCS catalyst and gas bubbles. The slurry liquid comprises HCS reaction hydrocarbon products which are liquid at the slurry reaction conditions and the gas bubbles comprise the uprising syngas, along with gas products of the HCS reaction, a significant amount of which comprises steam or water vapor. The syngas is bubbled up into the bottom of slurry 14 through suitable gas distribution means located across the surface of an otherwise gas and liquid impermeable tray 20, located near the bottom of the reactor. Not shown is filtration means, such as one or more liquid filters in the reactive slurry 14 or in one or more filtration vessels external of the reactor. Such filtration means separate the hydrocarbon slurry liquid from the catalyst particles as filtrate, and pass the filtrate to further processing and upgrading. Magnetic means may also be used to separate the catalyst particles from the hydrocarbon liquid product if the catalyst particles are magnetic or paramagnetic, as is disclosed in the prior art. Filtration means is not shown in any of the other Figures for the sake of convenience and simplicity. The interior 22 of a catalyst rejuvenating means which comprises a hollow tube 24, defines a catalyst rejuvenating zone. Tube 24 has means, which comprises a gas line 26 located near the bottom of the tube for injecting hydrogen or a hydrogen containing catalyst rejuvenating gas into the catalyst rejuvenating zone 22. The reactor contains one or more catalyst rejuvenating means, of which only one (24) is shown for the sake of convenience. A baffle plate 27, such as a cone, is located below the bottom of the rejuvenation tube to, prevent syngas from entering into the catalyst rejuvenating zone and interfering with the catalyst rejuvenation. The top 28 of the rejuvenation tube 24 extends up and out of the top 34 of the reactive slurry 14 and is surrounded by a hollow, cylindrical shroud or conduit 30 in the form of a tube or pipe, which provides an annular flow path 32 between the outside surface of the tube and the interior surface of the shroud. In this embodiment, the bottom of the shroud extends down into the slurry, although it could also be proximate to the top of the slurry also. The upper interior portion of conduit or tube 30 defines an offgas disengaging zone 31, in which the offgas is released from the rejuvenated catalyst slurry and passed up into gas disengaging and collecting zone 42 of the reactor, from where it is removed from the reactor via gas line 18. During catalyst rejuvenation, which may operate either continuously or intermittently, catalyst rejuvenating gas is injected into the catalyst rejuvenating zone 22 in which it contacts the catalyst in the slurry, thereby restoring at least a portion of its catalytic activity to produce a rejuvenated catalyst slurry and a rejuvenating offgas. The rejuvenating gas also acts as a lift gas and imparts a net upward velocity to the catalyst containing slurry in the tube, so that, as long as the rejuvenating gas is being injected into the rejuvenation zone, there is a continuous circulation of slurry from the slurry body 14 into the bottom of the tube, as indicated by arrows 15. The slurry body 14, in which at least a portion of the catalyst present therein has been at least partially reversibly deactivated, surrounds the rejuvenation tube and zone. Thus, in this embodiment, the rejuvenation zone is located in, but separate from, the slurry body 14, by the outer wall of the rejuvenation tube 24. The rejuvenated catalyst slurry produced in zone 22 passes up through the tube and out the top 28, where it bubbles and foams as it releases the offgas up through the gas disengaging zone 31, to form an offgas lean, rejuvenated catalyst slurry. The offgas lean catalyst rejuvenated slurry passes down into the annular flow path 32 as indicated by arrows 33, and releases more gas as it flows down and back into the slurry body 14. The presence of the gas lean slurry in the annular flow path also serves as a barrier to prevent released offgas from contacting the slurry body below. The released offgas passes up through zone 31 in conduit 30, as indicated by arrow 40, and into gas collecting zone 42 in the top of the reactor where it is removed from the reactor via line 18. The uprising gas continuously released from the top of the slurry serves to sweep the offgas up and out of the reactor before it can contact the top of the slurry body. Thus, the offgas is not introduced into the slurry body 14 as it is in the prior art processes. In another embodiment illustrated in FIG. 1 (*c*), the top 28 of the rejuvenation tube 24 extends further up and away from the top 34 of the slurry body, so that the offgas released by the slurry as it exits out the top of the tube and falls back into the slurry body, is released far enough over the top of the slurry to enable so as to be swept up and out of the reactor by the gas rising up out of the top of the slurry body before it can contact the top of the slurry body. This, therefore, also prevents, or at least minimizes offgas contact with the slurry body. During operation of the slurry reactor, there is a continuous upflow of gas from the surface of the slurry and out the reactor, due to the rising gas bubbles therein. This flow is sufficient to sweep the offgas up and out of the reactor before it is able to contact the slurry below.

FIG. 2 schematically illustrates the prior art in which an HCS slurry type reactor 50 contains at least one catalyst slurry rejuvenating tube 24. Reactor 50 and the slurry 14 are the same as reactor 10 and slurry 14 described above and need not be described further. Reactor 50 contains the same catalyst slurry rejuvenating tube, rejuvenating gas injecting means and lower baffle 27 as is described above. However, the top 28 of the rejuvenating tube 24 is wholly immersed within the slurry body. As a consequence, both the offgas and the catalyst rejuvenated slurry are passed directly into the slurry body 14, whereby the catalyst deactivating species present in the offgas deactivate a portion of the catalyst in the slurry body, thereby reducing the effectiveness of the catalyst rejuvenation.

Figure 3:
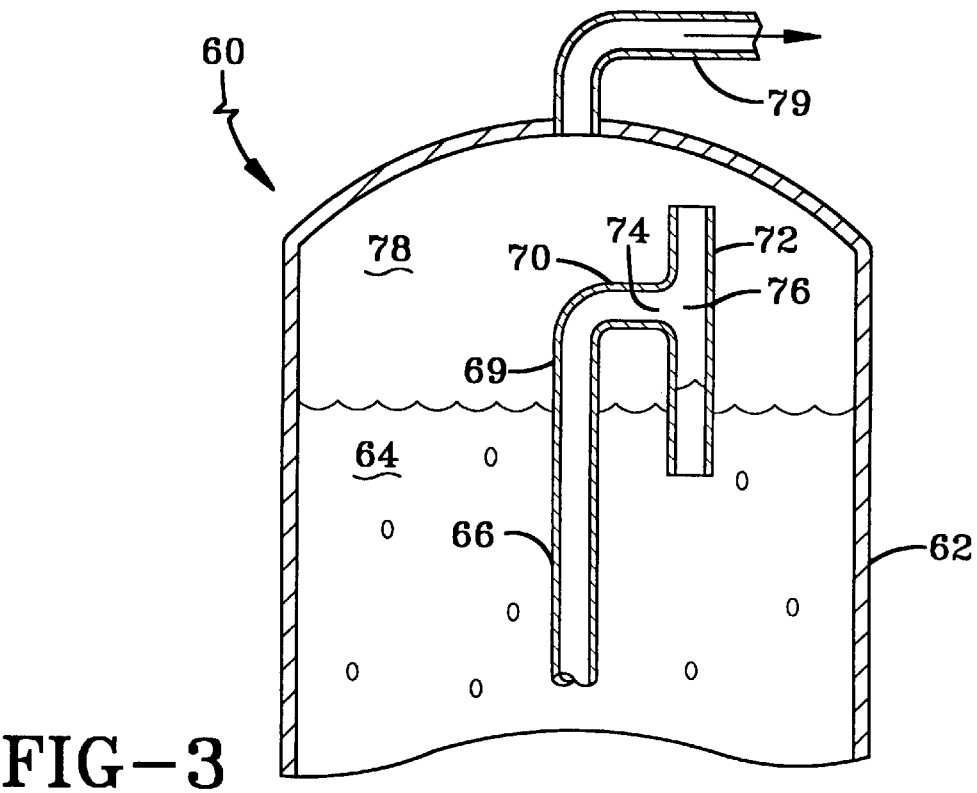
FIG. 3 is a schematic cross section, in partial form, of a slurry reactor containing an offgas separating means according to another embodiment of the invention.
Figure 4:
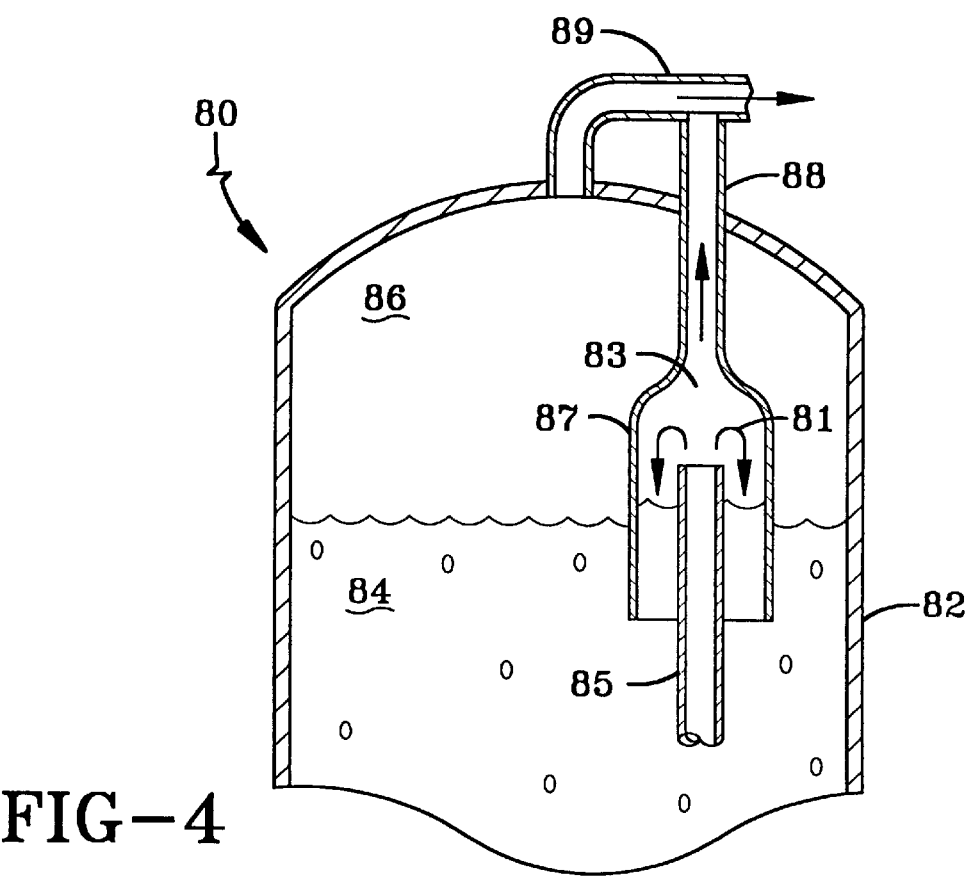
FIG. 4 illustrates a partial cross-sectional schematic of an embodiment of the invention wherein the offgas is passed from the rejuvenation zone directly outside the reactor.

FIG. 3 is a simple, partial cross sectional schematic of another embodiment of the practice of the invention. Thus, turning to FIG. 3, the upper portion of an HCS slurry type reactor 60 comprises a cylindrical outer shell 62 containing a three phase reactive HCS slurry 64 within, in which uprising bubbles of syngas contact a particulate catalyst suspended in the slurry to form hydrocarbon products, at least a portion of which are liquid at the slurry reaction conditions. Reactor 60 and slurry 64 are essentially the same as with reactor 10 above. However, the catalyst rejuvenating tube 66, while being similar in all other respects to that of tube 24 described above, is different in the upper portion 69 of the tube, in that it extends up and out of the slurry, bends and extends laterally over to form a transverse portion 70, which opens into a vertically oriented, hollow conduit 72, via orifice 74. Conduit 72 is the gas disengaging means for disengaging the offgas from the catalyst rejuvenated slurry, the interior 76 of which defines both an upward rising offgas disengaging zone in fluid communication with the upper, gas collecting zone 78 inside the reactor and a downwardly extending lower portion in fluid communication with the slurry body which serves as a slurry flow path for returning the offgas lean and catalyst rejuvenated slurry back into the slurry body. Thus, both the catalyst rejuvenated slurry and the offgas are passed up through the rejuvenating tube, over and out of orifice 74 and into zone 76, in which the gas escapes from the slurry and rises up and into the gas collecting zone 78 at the top of the reactor, from where it is removed via gas line 79. The gas lean, catalyst activated slurry passes down through conduit 72 and back into the slurry body. FIG. 4 is partial cross sectional schematic of the upper portion of a slurry reactor 80 comprising cylindrical outer shell 82 and containing a reactive, three phase HCS slurry 84 within, with synthesis gas bubbled up through the slurry, similar in almost all respects to reactor 10 described above. In this embodiment, the catalyst rejuvenating tube 85 and shroud 87 are similar to that illustrated and described in FIG. 1 above, except that the shroud or hollow gas disengaging conduit 87 is vented by means of an extension 88 out of the reactor and into the gas withdrawal line 89, external to the reactor. The gas disengaging zone 83 and annular slurry flow path 81 are otherwise the same as that of the embodiment of FIG. 1. In this embodiment, instead of being released into the gas collection zone 86 near the top of the reactor, the offgas released from the catalyst rejuvenated slurry is passed directly out of the reactor without mixing with the gas rising up from the slurry body.

Figure 5:
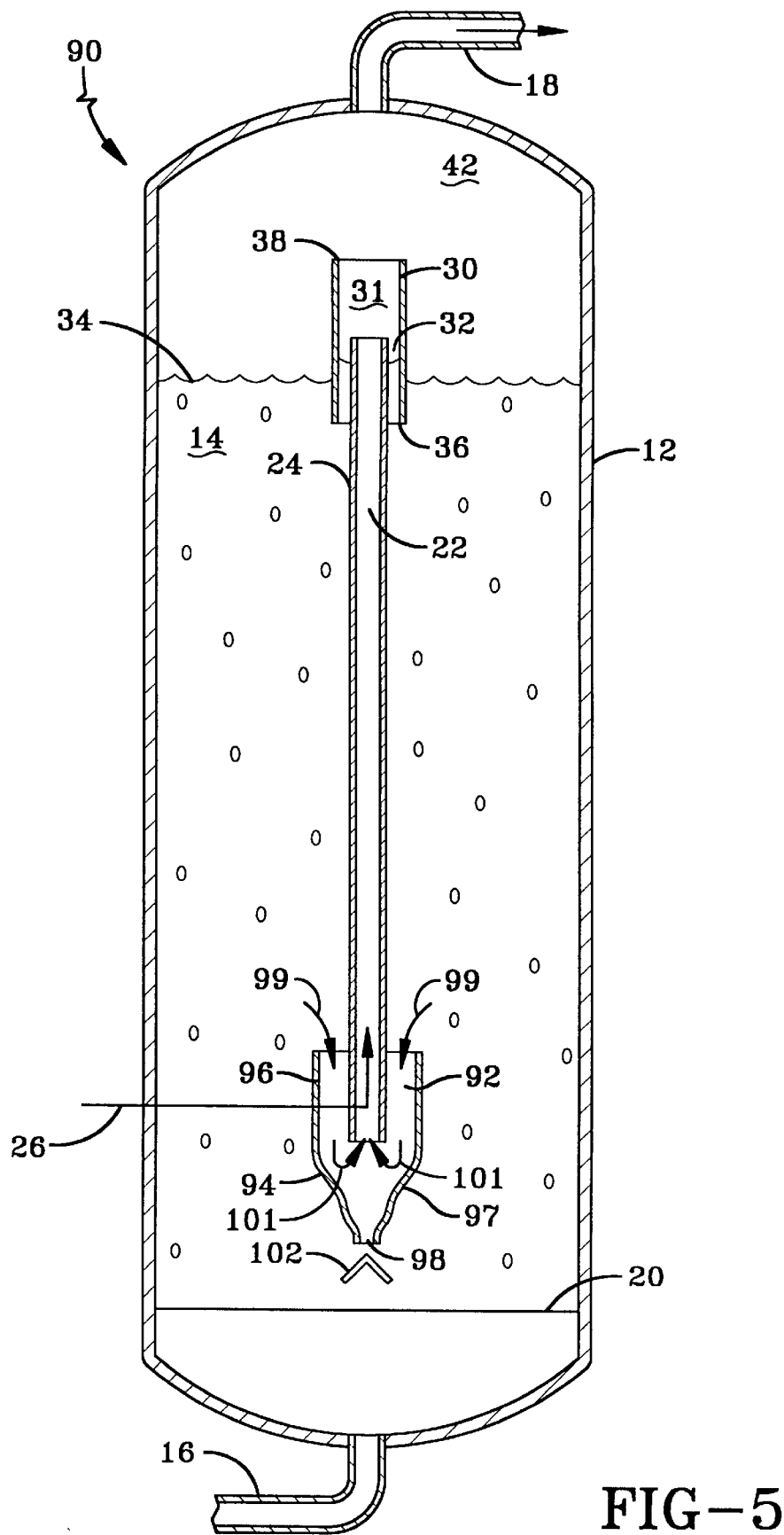
FIG. 5 schematically illustrates an offgas separating means of the invention in combination with a rejuvenation tube having gas disengaging means.

In the embodiment illustrated in FIG. 5, the rejuvenating tube, slurry and reactor are identical to that illustrated in FIGS. 1 (*a*) and 1 (*b*), except that the catalyst deactivated slurry withdrawn from the slurry body and passed into the rejuvenation tube is degassed before entering the rejuvenation zone 22. In the practice of the invention, it is preferred that syngas gas present in the slurry, which would adversely interfere with the catalyst rejuvenation process, be removed before the slurry is passed into the catalyst rejuvenating zone. In the embodiment shown and described in FIG. 5, this is accomplished in a gas disengaging zone 92 defined in this embodiment as the annular space between the outer wall of the rejuvenating tube 24 and the inner wall of a hollow, cylindrical cup or baffle 94. The cup 94 serves as a gas disengaging means for degassing the slurry before it enters the rejuvenation tube. Thus, turning to FIG. 5, the vertical upper wall 96 of cup 94 surrounds the bottom of catalyst rejuvenation tube 24 to define an annular space 92 within. The bottom 97 of the cup slopes down below the open bottom of the rejuvenation tube, where it terminates in a centrally located orifice 98. The angle of the sloping bottom is greater than the angle of repose of the catalyst particles in the slurry liquid. When catalyst rejuvenating gas is injected into the rejuvenating zone 22, it imparts a net upward velocity to the slurry within and thereby sets up a continuous flow of slurry from the slurry body 14 into the top of the cup 94 as indicated by arrows 99. The outer wall of the cup acts as a baffle to prevent the uprising syngas bubbles from contacting the degassing slurry flowing down through the annular path 92 between the outer surface of the tub e and the inner surface of the cup. Thus, the annular flow path is a quiescent zone, in which gas bubbles are disengaged from the slurry flowing therethrough and are not replaced by the uprising syngas bubbles, due to the presence of the surrounding cup which acts as a baffle to prevent the syngas from contacting the slurry inside. This results in a gas reduced slurry entering the bottom of the rejuvenation tube as indicated by arrows 101. Orifice 98 is sized to permit catalyst particles disengaged from the slurry flowing down through the annular flow path and into the rejuvenating tube from building up and retarding or plugging the slurry flow into the tube. Depending on how it is sized with respect to the slurry flow rate through the annular zone, the time it takes to enter the rejuvenation tube, the height of the cup and the diameter of the cup relative to the diameter of the rejuvenation tube, disengaging cup 94 may also concentrate the catalyst in the slurry entering the up into the rejuvenation zone. In yet another embodiment (not shown) a downcomer with an associated gas disengaging zone, as disclosed in U.S. Pat. No. 5,382,748, may be used to disengaging gas bubbles from the slurry before it is fed into the rejuvenation zone. It has also recently been discovered, that if properly sized, such a gas disengaging cup will also concentrate the catalyst entering the downcomer, so that the catalyst concentration in the slurry entering the rejuvenation zone is greater than that in the slurry body. The downcomer degasses and, optionally, concentrates the catalyst in the slurry, which is then passed into the catalyst rejuvenating zone.

In the practice of the invention it is beneficial and preferable to at least partially degas the slurry before it contacts the rejuvenation gas in the rejuvenation zone, because it has been found that the presence of CO in the slurry prevents catalyst rejuvenation until the CO has been consumed. In the worst case of high CO concentration and short residence time in the rejuvenation zone, no rejuvenation takes place. Another consideration is the wasteful consumption of valuable CO into primarily methane if it is present in the rejuvenation zone. The best case is where all CO is removed from the slurry before it enters the rejuvenation zone, so that no CO is present. The hydrogen rejuvenating gas injected into the rejuvenation zone makes the $H_2$ to CO mole ratio substantially greater that the 2.1 to 1 stoichiometric mole ratio. This tends to convert the CO in the rejuvenation zone into lower molecular weight gasses (primarily methane), instead of the desired, more valuable liquid products. Further, one of the most expensive unit operations in an HCS process which generates syngas from methane, is the production of the oxygen required in the syngas generation. The net result of methane production from syngas in the rejuvenation zone is to have converted pure oxygen and methane back into methane and $H_2O$. In addition to unreacted syngas, the gas bubbles in the reactive slurry body also comprise gaseous products of the hydrocarbon synthesis reactions which include hydrocarbons, low molecular weight oxygenates and substantial quantities of water vapor (the water vapor can comprise as much as 50% of the gaseous reaction products) which act as diluents for the hydrogen rejuvenating gas, thereby further reducing its effectiveness in rejuvenating the catalyst. For these reason, therefore, it is beneficial to remove as much syngas as possible from the slurry before it enters the rejuvenation. Employing gas disengaging means in the practice of the invention can remove as much as 90 volume % of the gas bubbles containing CO and other gasses from the slurry before it enters the rejuvenation zone. In the downcomer embodiment described above, the gas disengaging means also concentrates the catalyst in the slurry flowing into the rejuvenation zone, which further increases the slurry density, thereby increases the rate at which the slurry flows into the rejuvenation zone for a given rejuvenation gas flow rate. On the other hand, the velocity of the rejuvenation gas in the rejuvenation zone or tube is such that the slurry density therein is less than that of the main body of slurry in the reactor, in order to insure slurry circulation up through and out of the rejuvenation zone. The hydrogen or hydrogen containing catalyst rejuvenation gas injected into the rejuvenation zone comprises hydrogen which may contain other gasses such as nitrogen, $CO_2$, $H_2O$, $CH_4$, $C_2$–$C_{4+}$ hydrocarbons, and also CO, as long as the mole ratio of the $H_2$ to CO is sufficient to remove the CO and still rejuvenate at least a portion of the catalyst.

As disclosed in U.S. Pat. No. 5,288,673, the degree of catalyst rejuvenation can be controlled by independently controlling the slurry temperature in the rejuvenating zone irrespective of the temperature of the main body of slurry in the surrounding HCS reaction zone. This patent discloses that temperature control in the rejuvenation zone or tubes is achieved by one or more of either increasing or decreasing the slurry residence time in the zone, so as to utilize the exothermic nature of the rejuvenation reactions, by insulating the rejuvenation tubes, by introducing heat or a cooling medium into the zone, by preheating the rejuvenating gas, etc. The '673 patent teaches that the temperature in the rejuvenation zone should be high enough to remove CO and at least partially rejuvenate the catalyst and low enough to minimize methane formation and wax (~$C_{20+}$ alkanes) hydrogenolysis. These teachings apply to the present invention also.

In an HCS process, liquid and gaseous hydrocarbon products are formed by contacting a syngas comprising a mixture of $H_2$ and CO with a suitable Fischer-Tropsch type HCS catalyst, under shifting or non-shifting conditions and preferably non-shifting conditions in which little or no water gas shift reaction occurs, particularly when the catalytic metal comprises Co, Ru or mixture thereof Suitable Fischer-Tropsch reaction types of catalyst comprise, for example, one or more Group VIII catalytic metals such as Fe, Ni, Co, Ru and Re. In one embodiment the catalyst comprises catalytically effective amounts of Co and one or more of Re, Ru, Fe, Ni, Th, Zr, Hf, U, Mg, La on a suitable inorganic support material, preferably one which comprises one or more refractory metal oxides. Preferred supports for Co containing catalysts comprise titania, particularly when employing a slurry HCS process in which higher molecular weight, primarily paraffinic liquid hydrocarbon products are desired. Useful catalysts and their preparation are known and illustrative, but nonlimiting examples may be found, for example, in U.S. Pat. Nos. 4,568,663; 4,663,305; 4,542,122; 4,621,072 and 5,545,674.

The hydrocarbons produced by an HCS process according to the invention are typically upgraded to more valuable products, by subjecting all or a portion of the $C_{5+}$ hydrocarbons to fractionation and/or conversion. By conversion is meant one or more operations in which the molecular structure of at least a portion of the hydrocarbon is changed and includes both noncatalytic processing (e.g., steam cracking), and catalytic processing (e.g., catalytic cracking) in which a fraction is contacted with a suitable catalyst. If hydrogen is present as a reactant, such process steps are typically referred to as hydroconversion and include, for example, hydroisomerization, hydrocracking, hydrodewaxing, hydrorefining and the more severe hydrorefining referred to as hydrotreating, all conducted at conditions well known in the literature for hydroconversion of hydrocarbon feeds, including hydrocarbon feeds rich in paraffins. Illustrative, but nonlimiting examples of more valuable products formed by conversion include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils. Industrial oil includes well drilling fluids, agricultural oils, heat transfer fluids and the like.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A slurry reactor containing means for rejuvenating a particulate catalyst dispersed in a three phase slurry comprising said catalyst, slurry liquid and gas bubbles, said means comprising a hollow fluid conduit having an entrance and an exit for passing said slurry therethrough the exit being out of the slurry, means for injecting a gas into the interior of said conduit and gas separating means located proximate said conduit exit and in fluid communication with said interior of said conduit, for separating said gas from said slurry liquid exiting said conduit.

2. A reactor according to claim 1 wherein said catalyst rejuvenation means has gas disengaging means for disengaging gas from said slurry before it enters said slurry conduit.

3. A slurry hydrocarbon synthesis process for forming hydrocarbons, at least a potion of which are liquid, which comprises the steps of:

(a) contacting a syngas comprising a mixture of $H_2$ and CO in the presence of catalyst deactivating species, with a solid, particulate hydrocarbon synthesis catalyst in a slurry body comprising said catalyst, hydrocarbon slurry liquid and gas bubbles, under reaction conditions effective to form hydrocarbons from said syngas, wherein said species present at least partially, reversibly deactivate said catalyst in said slurry and wherein said hydrocarbon liquid comprises HCS reaction products which are liquid at said reaction conditions;

(b) passing a portion of said slurry from said slurry body into a catalyst rejuvenation zone;

(c) contacting said slurry in said rejuvenation zone with a catalyst rejuvenating gas which at least partially rejuvenates the catalyst therein to form (i) a rejuvenated catalyst slurry and (ii) a rejuvenating offgas which contains species which will deactivate said catalyst;

(d) separating the rejuvenating offgas from the rejuvenated catalyst slurry in a gas separating zone out of the slurry.

4. A process according to claim 3 wherein an offgas lean rejuvenated slurry is formed in step (d) and is passed back into said slurry body.

5. A process according to claim 4 wherein said slurry withdrawn from said slurry body is passed through a gas disengaging zone to remove at least a portion of said gas bubbles from said slurry before it is passed into said rejuvenation zone.

6. A process according to claim 5 wherein said gas disengaging zone also concentrates said catalyst in said slurry.

7. A process according to claim 5 wherein said slurry body comprises the reactive slurry in a hydrocarbon synthesis reactor.

8. A process according to claim 5 wherein said rejuvenation and offgas separation occur within said reactor.

9. A process according to claim 5 wherein said catalyst comprises cobalt on a support.

10. A process according to claim 9 wherein said support includes titania.

11. A process according to claim 7 wherein said hydrocarbon products comprise $C_5+$ hydrocarbons, at least a portion of which are subjected to conversion.

12. A process according to claim 11 wherein the conversion is catalytic conversion in the presence of hydrogen.

13. A process according to claim 11 wherein the conversion is steam cracking.

14. A process according to claim 12 wherein the catalytic conversion comprises hydroisomerization.

* * * * *